(12) United States Patent
Wesstrom

(10) Patent No.: US 9,104,085 B2
(45) Date of Patent: Aug. 11, 2015

(54) METHOD FOR MODULATING A CARRIER LIGHT WAVE

(71) Applicant: FINISAR SWEDEN AB, Jarfalla (SE)

(72) Inventor: Jan-Olof Wesstrom, Stockholm (SE)

(73) Assignee: FINISAR SWEDEN AB, Jarfalla (SE)

( * ) Notice: Subject to any disclaimer, the term of this patent is extended or adjusted under 35 U.S.C. 154(b) by 176 days.

(21) Appl. No.: 14/017,553

(22) Filed: Sep. 4, 2013

(65) Prior Publication Data

US 2015/0063742 A1  Mar. 5, 2015

(51) Int. Cl.
*G02F 1/035* (2006.01)
*G02F 1/225* (2006.01)
*H04B 10/50* (2013.01)
*G02F 1/025* (2006.01)

(52) U.S. Cl.
CPC .............. *G02F 1/225* (2013.01); *H04B 10/50* (2013.01); *G02F 1/025* (2013.01); *G02F 1/035* (2013.01); *G02F 1/0356* (2013.01); *G02F 1/2255* (2013.01)

(58) Field of Classification Search
CPC ....... G02F 1/225; G02F 1/2255; G02F 1/025; G02F 1/0356; G02F 1/035
USPC .......................................................... 385/3
See application file for complete search history.

(56) References Cited

U.S. PATENT DOCUMENTS 8,041,228 B2 * 10/2011 Charlet et al. ................ 398/158

FOREIGN PATENT DOCUMENTS

WO  2011022308  2/2011

OTHER PUBLICATIONS

Yossef Ehrlichman, et. al., "A Method for Generating Arbitrary Optical Signal Constellations Using Direct Digital Drive", Journal of Light Wave Technology, vol. 29, No. 17, Sep. 1, 2011.
Hyeon Yeong Choi, et. al., "A New Multi-Purpose Optical Transmitter for Higher-Order QAM Generation", OFC/NFOEC Technical Digest, 2013 (Abstract Only).

* cited by examiner

*Primary Examiner* — Jerry Blevins
(74) *Attorney, Agent, or Firm* — Young & Thompson

(57) ABSTRACT

Method for modulating a carrier light wave with symbols, led through a modulating interferometer, the total path phase shift being the sum of a respective first, second, third or fourth static phase shift and a respective first, second, third or fourth variable modulating phase shift amount. For each of at least two symbols:

the first variable modulating phase shift equals the sum of the first pair phase shift and the common phase shift;

the second variable modulating phase shift equals the sum of the negative of the first pair phase shift and the common phase shift;

the third variable modulating phase shift equals the sum of the second pair phase shift and the negative of the common phase shift;

the fourth variable modulating phase shift equals the sum of the negative of the second pair phase shift and the negative of the common phase shift.

25 Claims, 9 Drawing Sheets

METHOD FOR MODULATING A CARRIER LIGHT WAVE

The present invention relates to a method for modulating a carrier light wave, more specifically for achieving a modulated light wave carrying information about one or several symbols selected among a predetermined set of symbols.

In particular, the present invention relates to modulating a carrier light wave using phase modulation and/or amplitude modulation.

The invention also relates to a system using such method, and a method for manufacturing or calibrating such a system.

In many applications, in particular for high speed optical communication systems, a modulated light wave is used to carry digital information from a sender to a receiver. In many such systems, the modulation may be phase and/or amplitude modulation. Examples include phase shift keying modulation techniques, such as Binary Phase Shift Keying (BPSK) and Quadrature Phase Shift Keying (QPSK), and Quadrature Amplitude Modulation (QAM) techniques, such as QAM8, QAM16 and QAM64.

In order to achieve such modulation of a carrier light wave, it is known to split the carrier light wave using a splitter, and to recombine the carrier light wave in a combiner after a relative phase shift of the different light paths between the splitter and combiner. The phase shift can for instance be achieved using electrodes attached to each path, to each of which electrodes a variable electric signal can be applied so that the refractive index of the path wave guide material changes, forming a Mach-Zehnder interferometer. Such variable phase shift can be combined with a predetermined fixed phase shift for each waveguide. This way, each symbol can be modulated as a unique combination of total phase shifts along each path. A modulator in which a first parallel-coupled MZM controls the imaginary part of the electromagnetic field (Q value) and a second parallel-coupled MZM controls the corresponding real part (I value) is called an IQ modulator.

WO 2011022308 A2 discloses using a Mach-Zehnder modulator (MZM), yielding two paths, or two parallel-coupled child MZMs on one respective path of a parent MZM, yielding in total four paths, with variable-current electrodes on each path, for such modulation.

Known two-armed structures offers limited possibilities to achieve advanced modulation formats, such as higher-order QAM formats, without using complicated drive electronics. In many cases, it is preferred to use electrode voltages that have predetermined, fixed values, preferably at a few, most preferably only two, different voltage values. This makes the control electronics fast and simple, which is required for high bitrates.

Using only two paths also leads to problems with transients when changing from one symbol to another, since the modulation of the carrier wave assumes complicated patterns in the process of changing from a first set of electrode voltages to a second set of voltages. Yossef Ehrlichman, et. al., "A Method for Generating Arbitrary Optical Signal Constellations Using Direct Digital Drive", JOURNAL OF LIGHT WAVE TECHNOLOGY, VOL. 29, NO. 17, Sep. 1, 2011, discloses a method for creating various such symbols using a two-armed structure.

Hyeon Yeong Choi, et. al., "A New Multi-Purpose Optical Transmitter for Higher-Order QAM Generation", OFC/NFOEC Technical Digest, 2013, discloses a method for creating arbitrary modulated symbols using a first and a second four-arm MZM aggregate.

These methods also require complicated drive electronics, making them expensive and less suitable for high-frequency applications.

Furthermore, WO 2011022308 A2, above, discloses the use of multiple, individually controlled, electrode segments for each optical path in the modulator. The purpose of this is to mitigate the nonlinearity of the relation between the electrode voltage and the resulting refractive index of the waveguide material. The segments are controlled individually to select the total phase modulation applied to each path.

A problem in some types of such systems is low transmission power. The output light power is less than the input carrier wave power. As a consequence, one may have to either increase the power of the carrier waveguide or to add amplifiers if the signal is to be sent over long distances.

It would hence be desirable to provide a modulation method which provides an average output power of the modulated signal which is closer to the input power of the carrier light wave, but which method does not involve complicated drive electronics.

The present invention solves the above described problems.

Hence, the invention relates to a method for modulating a carrier light wave so that a modulated light wave is achieved, which modulated light wave carries information by means of symbols selected from a set of at least two different symbols, wherein the carrier light wave is led through a modulating interferometer comprising a respective first, second, third and fourth parallel-coupled waveguiding modulation path, wherein the carrier light wave is first split, subsequently led through said four paths and then recombined, wherein for modulating each respective symbol the respective light led through each respective path, between the said split and the said recombining, is phase shifted by a respective total path phase shift, which total path phase shift is the sum of a possible respective first, second, third or fourth static phase shift and a respective first, second, third or fourth variable modulating phase shift amount, and wherein each symbol in the said set of symbols is associated with a respective combination of such total phase shift amounts, characterized in that, for at least two of the symbols in said set of symbols there is defined a respective first non-zero pair phase shift amount, a respective second non-zero pair phase shift amount and a respective non-zero common phase shift amount, in that, for each of said at least two symbols, the absolute value of said first pair phase shift amounts are equal, the absolute value of said second pair phase shift amounts are equal and the absolute value of said common phase shift amounts are equal, and in that, for each of said at least two symbols, the first respective variable modulating phase shift amount is equal to the sum of the respective first pair phase shift amount and the respective common phase shift amount; the second respective variable modulating phase shift amount is equal to the sum of the negative of the respective first pair phase shift amount and the respective common phase shift amount; the third respective variable modulating phase shift amount is equal to the sum of the respective second pair phase shift amount and the negative of the respective common phase shift amount; and the fourth respective variable modulating phase shift amount is equal to the sum of the negative of the respective second pair phase shift amount and the negative of the respective common phase shift amount.

The invention also relates to a light wave modulating device, as well as to a method for manufacturing or calibrating such a device.

In the following, the invention will be described in detail, with reference to the appended drawings, in which:

FIGS. 8-10a show respective phasor or constellation diagrams of respective modulating devices according to the invention;

For all figures, the same or corresponding parts share the same reference numerals.

Using optical communication technology, it is possible to send information using both amplitude and phase modulation schemes. One of the advantages of this, as compared to only using amplitude modulation, is that more information can be sent over the same optical frequency band.

Figure 2:
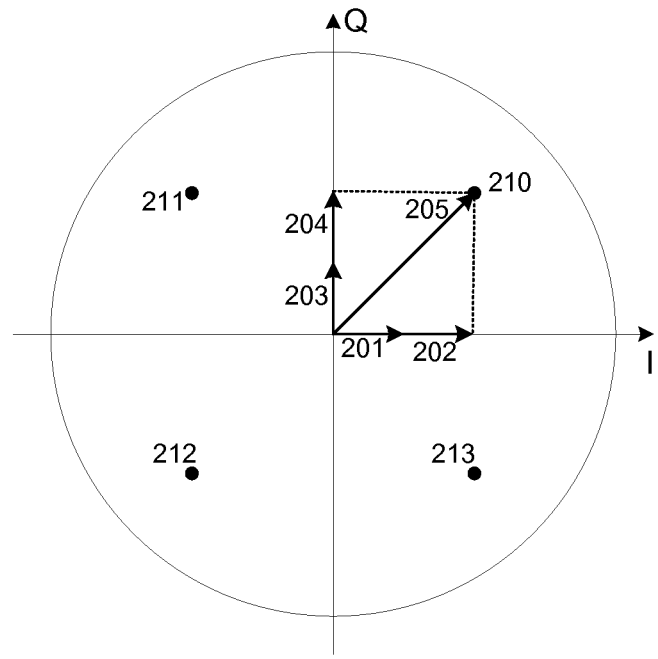
FIG. 2 shows a phasor or constellation diagram of a conventional modulating device.

One example of a conventional advanced modulation format is the Quadrature Phase Shift Keying (QPSK) scheme, involving four distinct symbols 210, 211, 212, 213 as shown in FIG. 2 in a phasor diagram. The circle illustrates the unity amplitude transmission.

Figure 1A:
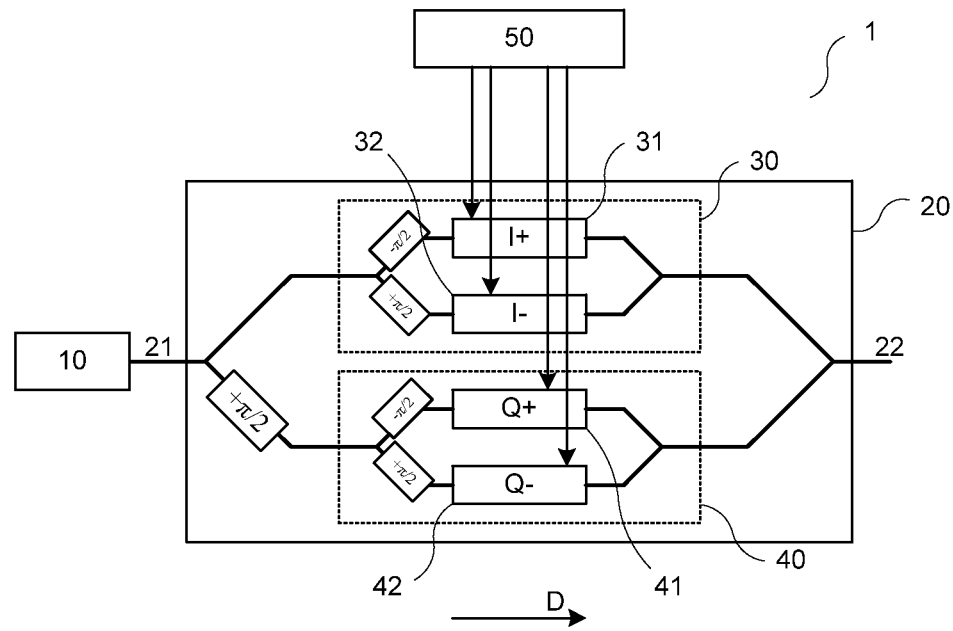
FIG. 1a shows a conventional modulating device.

FIG. 1a illustrates a so called IQ modulator 1 of conventional type, which is capable of QPSK modulating a carrier light wave 21 incident from a light source, such as a semiconductor laser 10, and to achieve a modulated light wave 22 that can be transmitted to a receiver (not shown) for demodulation and interpretation. D is the light travel direction.

The modulator 1 comprises a main or parent Mach-Zehnder Interferometer (MZI) 20, the respective paths of which comprises one respective child MZI 30, 40 each. The child MZIs 30, 40 are parallel-coupled, where the child MZI 30 comprises first and second paths of the modulator 1 and the child MZI 40 comprises third and fourth paths of the modulator 1.

Each child MZI is set up as if it were used for so-called Binary Phase Shift Keying (BPSK), which is a conventional modulation technique using two symbols. Taking, for instance, the child MZI 30, there is a static phase shift of $\pm\pi/2$ radians on each respective arm, implemented using a separate respective electrode, which is combined with a respective variable phase shift, across electrodes marked with I+ and I−, respectively, in FIG. 1a. The variable phase shift is performed using an electrode 31, 32 on the respective child MZI 30 arm, which is arranged to modify the refractive index of the light carrying material in the waveguide in question. In the exemplifying case, this is achieved by applying the said electric signal onto the respective electrode 31, 32, 41, 42 on the waveguide by a control device or drive unit 50 in order to achieve the corresponding modulating phase shift. The control device 50 is in turn fed with a data signal from a data source (not shown), and arranged to pairwise, in a push-pull fashion, phase shift the light wave traveling through the two child MZI 30 arms by $$+\frac{\pi}{2}$$

radians and $$-\frac{\pi}{2}$$

radians (I+ and I−, or I− and I+, depending on symbol), respectively. Such modulation results in that the light that has travelled through the child MZI 30 will assume one of two possible symbols, in which the complex light E-field has a value of either +1 or −1, on the real I-axis in a phasor diagram such as the one illustrated in FIG. 2.

That the control is "push-pull" means that the control device 50 controls the phase shift for light traveling through the two arms of the child MZI 30 to be equal but of opposite sign. For instance, if the electrodes 31, 32 are identical, the control device 50 can apply an equal electrical signal, but with opposite sign, to each of the two electrodes 31, 32. This is beneficial in many cases, since the control device 50 may apply a completely or partly antisymmetric noise to the electrodes, in turn cancelling out a larger part of the existing voltage noise and decreasing the optical phase noise.

The same can be said regarding child MZI 40, with the only difference that the parent MZI 20 arm leading up to the child MZI 40 has a static phase shift of an additional $$+\frac{\pi}{2}$$

radians as compared to child MZI 30, implemented using a separate electrode.

However, in contrast to BPSK modulation, in the case of QPSK modulation the four symbols 210-213 differ in both the real part (the I-axis) and the imaginary part (the Q-axis) of the complex E-field, as illustrated in FIG. 2.

Hence, for the IQ modulator illustrated in FIG. 1a, one of the child MZIs 40 has the mentioned initial static phase shift of $$+\frac{\pi}{2}$$

radians, which is applied before the light enters the child MZI 40. With such a setup, the child MZI 30 will be effective for modulating the real part of the E-field (I-axis in the phasor diagram of FIG. 2), and the child MZI 40 will be effective for modulating the imaginary part of the E-field (Q-axis). By applying respective electrical signals onto electrodes 31, 32; 41, 42 in a push-pull fashion, an I-data stream represented in the modulated light wave 22 by the electrical signal applied over time onto electrodes 31 and 32 of child MZI 30 can be represented as variations of the real part of the E-field of the modulated light wave, and correspondingly a Q-data stream represented by the electrical signal applied over time onto electrodes 41, 42 of child MZI can be represented in the modulated light wave 22 as variations of the corresponding imaginary part of the E-field. In QPSK, this can be done in a straightforward way by sending, in the form of corresponding electrical signals, the I-data stream to the I-child 30 and the Q-data stream to the Q-child 40.

The result is illustrated in FIG. 2, where the vectors 201, 202, 203 and 204 correspond to the light that has traveled through paths I+, I−, Q+ and Q−, respectively, and for a certain symbol where I+=1, I−=−1, Q+=1 and Q−=−1, so that the variable phase modulation applied by the respective electrodes 31, 32, 41, 42 is $$+\frac{\pi}{2}, -\frac{\pi}{2}, +\frac{\pi}{2} \text{ and } -\frac{\pi}{2},$$

respectively. Hence, the total phase shift, including the static modulation, for each path is according to Table I for this particular symbol:

TABLE I

| Vector | Data | Total phase shift |
|---|---|---|
| 201 | I+ = 1 | $\left(-\frac{\pi}{2}\right) + \frac{\pi}{2} = 0$ |
| 202 | I− = −1 | $\frac{\pi}{2} + \left(-\frac{\pi}{2}\right) = 0$ |
| 203 | Q+ = 1 | $\frac{\pi}{2} + \left(-\frac{\pi}{2}\right) + \frac{\pi}{2} = \frac{\pi}{2}$ |
| 204 | Q− = −1 | $\frac{\pi}{2} + \frac{\pi}{2} + \left(-\frac{\pi}{2}\right) = \frac{\pi}{2}$ |

The resulting vector 205 represents the output light wave 22 after final combination of the light waves output by the two child MZIs 30, 40.

If one neglects imperfections and absorption, each child MZI 30, 40 has a theoretical normalized optical transmission amplitude of 1, since at each symbol the two paths add up perfectly in phase. However, since the paths of the two child MZIs 30, 40 are $$\frac{\pi}{2}$$

radians out of phase with respect to each other at all symbols when using QPSK, their maximum normalized transmission amplitude, i.e. the length of vector 205, is only $$\sqrt{\frac{1}{2}}.$$

Higher transmission amplitudes are desirable, since they mean that a weaker input signal would be required for the same output signal transmission amplitude. Also, a stronger output signal to an output optical fiber is desirable, since it means that the signal can travel a longer distance before requiring amplification.

Figure 3:
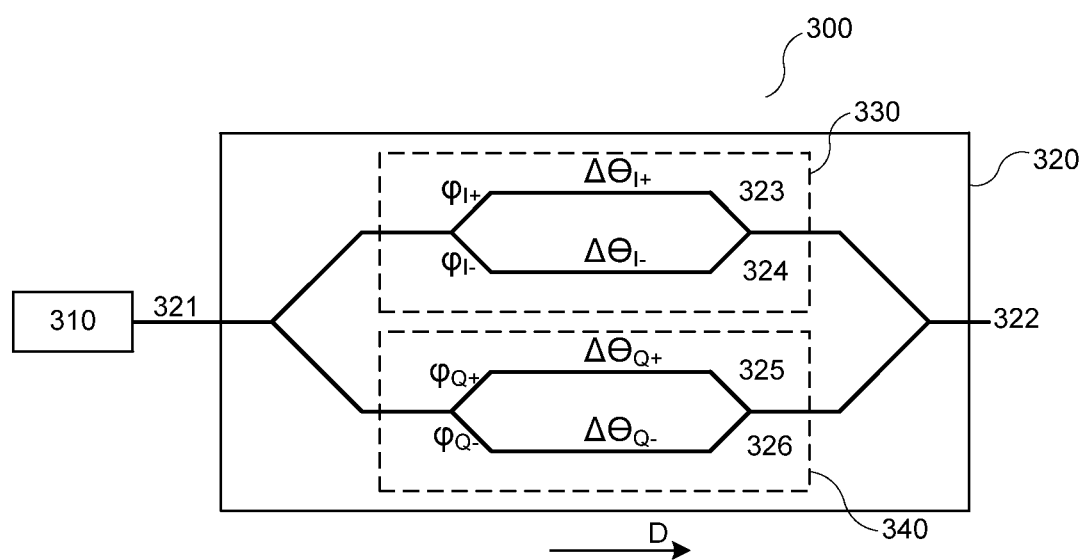
FIG. 3 shows a general modulation device according to the present invention.

FIG. 3 is a simplified, general view of a modulating device 300 which is similar to the device 1 of FIG. 1. The device 300 comprises a carrier light wave input arranged to accept an incident carrier light wave 321, which is output by a light source 310, such as a semiconductor laser, and is arranged to modulate the light wave 321 to achieve a modulated light wave 322 on a modulated light wave output.

The modulation is performed using a modulating interferometer comprising first 323, second 324, third 325 and fourth 326 parallel-coupled waveguiding modulation paths or arms. In the exemplifying case shown in FIG. 3, the paths 323-326 are arranged as the arms of two respective child MZIs 330, 340, in turn arranged on the respective arms of a parent MZI 320, similarly to the MZIs 20, 30, 40 described above in relation to FIG. 1a. Furthermore, the device 300 is arranged to first split the incident carrier light wave 321, subsequently convey the light wave through said four paths 323-326 and then to recombine the light wave to form the output light wave 322.

Each path 323-326 is arranged with a possible respective static phase shifting means for static phase shifting of the light wave conveyed through the path in question. The static phase shifting means may, for instance, be achieved by different light travelling lengths in each respective path, within each respective child MZI 330, 340 or in the parent MZI 320 before the light enters the respective child MZI 130, 140. Other arrangements are also possible, such as separate static phase shifting components, for example statically biased electrodes, along the different light paths. Such static phase shifting is conventional as such. The expression "static phase shift" is to be understood as a phase shift which is static for the individual light path considered, and which is the same for the respective light path for all modulated symbols. In FIG. 3, the static phase shift of each path 323, 324, 325, 326 is $\phi_{I+}$, $\phi_{I-}$, $\phi_{Q+}$, and $\phi_{Q-}$ radians, respectively. It is realized that the static phase shifting may be applied upstream or downstream of a corresponding variable phase shifting.

Namely, each path 123-126 is furthermore arranged with a respective variable modulating phase shifting means (not shown in FIG. 3, see FIG. 1b) for dynamic phase shifting of the light wave conveyed through the path in question, so as to, in combination with said static phase shifting, modulate the output light wave so that it carries information by means of symbols selected from a certain set of symbols. The dynamic phase shifting is controllable, for instance by feeding a variable electric signal to the modulating phase shifting means. In FIG. 3, the variable phase shift of each path 323, 324, 325, 326 is $\Delta\theta_{I+}$, $\Delta\theta_{I-}$, $\Delta\theta_{Q+}$, $\Delta\theta_{Q-}$ radians, respectively.

Hence, for modulating each respective symbol in said set, the respective light led through each respective path 323-326, between the said split and the said recombining, is phase shifted by a respective total path phase shift, which total path phase shift is the sum of a possible respective first $\phi_{I+}$, second $\phi_{I-}$, third $\phi_{Q+}$ or fourth $\phi_{Q-}$ static phase shift and a respective first $\Delta\theta_{I+}$, second $\Delta\theta_{I-}$, third, $\Delta\theta_{Q+}$ or fourth $\Delta\theta_{Q-}$ variable modulating phase shift amount. Each symbol in the said set is modulated using or defined by a unique respective combination of such total phase shift amounts, or at least associated with a respective combination of such total phase shift amounts (the modulator may be a subpart of a larger modulator).

Thus, the generally shown modulating device 300 comprises four modulated paths. The same is true regarding the light wave modulating device 100 shown in FIG. 1b, which is a more specific exemplifying embodiment of the invention. The device 100, which in many respects is similar to the device 1 described above in relation to FIG. 1a, is also suitable for performing a method according to the invention for modulating a carrier light wave 121 so that a modulated light wave 122 is achieved, which modulated light wave 122 carries information by means of symbols selected from a set of at least two, preferably at least four, different symbols.

The device 100 comprises a parent MZI 120, in turn comprising two child MZIs 130, 140, similar to MZIs 20, 30, 40, above. Each parallel-coupled path 123, 124, 125, 126 is furthermore arranged with a respective variable modulating phase shifting means, exemplified by respective modulation electrodes 131, 132, 141, 142, for dynamic phase shifting of the light wave conveyed through the path in question. Electrodes 131, 132, 141, 142 are similar to electrodes 31, 32, 41, 42, above.

To each electrode 131, 132, 141, 142 a respective electric signal is fed from a control means 150, controlling said electric signals to correspond to I- and Q data streams provided to the control means 150 from a data feeding source (not shown).

In the following, an embodiment of the invention will be described in relation to both the general device 300 of FIG. 3 and the more specific device 100 of FIG. 1b. To simplify the discussion, it is assumed that all splitters split the power in equal halves and that all combiners take the same amount of power from each contributing path. It is, however, realized that in some embodiments of the present invention, other splitting and recombination ratios may be used. Also, for now we assume a lossless transmission of light through each individual light path and also through each splitting and combining point, respectively.

At the bias point, in other words in a state without any dynamic modulation electrical signal applied to electrodes 131, 132, 141, 142, there are static phase shifts of $\phi_{I+}$, $\phi_{I-}$, $\phi_{Q+}$, $\phi_{Q-}$ radians, respectively. Then, the variable modulation provides additional phase shifts of $\Delta\theta_{I+}$, $\Delta\theta_{I-}$, $\Delta\theta_{Q+}$, $\Delta\theta_{Q-}$ radians, respectively.

The electrical amplitude transmission for the different symbols (indexed with s) can then be described as $$t_s = \sum_{p=(I+,I-,Q+,Q-)} t_p e^{j(\varphi_p + \Delta\theta_p^Q)}, \quad (1)$$

where p is the path, $t_p$ is the amplitude transmission of each path; $\phi_p$ is the static phase shift, i.e. the relative phase shift in each path at the bias point; $\Delta\theta_p^2$ is the variable phase shift, i.e. the effect of the dynamic modulation on the phase of path p when a certain symbol s is modulated. In the assumed case with a symmetric modulator, $t_p=0.25$.

In the above described case of conventional QPSK modulation, the configuration of the regular IQ modulator can be described as in table II. Note that the symbol described in table I, above, is symbol 1 in table II.

The phase shifts described in table II in combination with (1) results in a constellation diagram as shown in FIG. 2, with conventionally modulated QPSK symbols 210-213.

In contrast thereto, and according to the invention, for each symbol s in said set of symbols, or at least for two, preferably four, of said symbols, there is defined a respective first non-zero pair phase shift amount $P1_s$, a respective second non-zero pair phase shift amount $P2_s$ and a respective non-zero common phase shift amount $C_s$. For each of said at least two, preferably four, symbols, the absolute values of the respective first pair phase shift amounts $P1_s$ are equal; the absolute values of the respective second pair phase shift amounts $P2_s$ are equal; and the absolute values of the respective common phase shift amounts $C_s$ are equal. It is preferred that all symbols sharing these properties are positioned symmetrically in a constellation diagram like the one shown in FIG. 2 in relation to each other and to the origin of the constellation diagram.

Moreover, in order to modulate each respective symbol, each modulating phase shifting means 131, 132, 141, 142 is arranged to be controlled by the control means 150 so that:

The amount of the respective first variable modulating phase shift $\Delta\theta_{I+}$ is equal to the sum of the respective first pair phase shift amount $P1_s$ and the respective common phase shift amount $C_s$.

The amount of the respective second variable modulating phase shift $\Delta\theta_{I-}$ is equal to the sum of the negative of the respective first pair phase shift amount $P1_s$ and the respective common phase shift amount $C_s$.

The amount of the respective third variable modulating phase shift $\Delta\theta_{Q+}$ is equal to the sum of the respective second pair phase shift amount $P2_s$ and the negative of the respective common phase shift amount $C_s$.

The amount of the respective fourth variable modulating phase shift $\Delta\theta_{Q-}$ is equal to the sum of the negative of the respective second pair phase shift amount $P2_s$ and the negative of the respective common phase shift amount $C_s$.

Figure 1B:
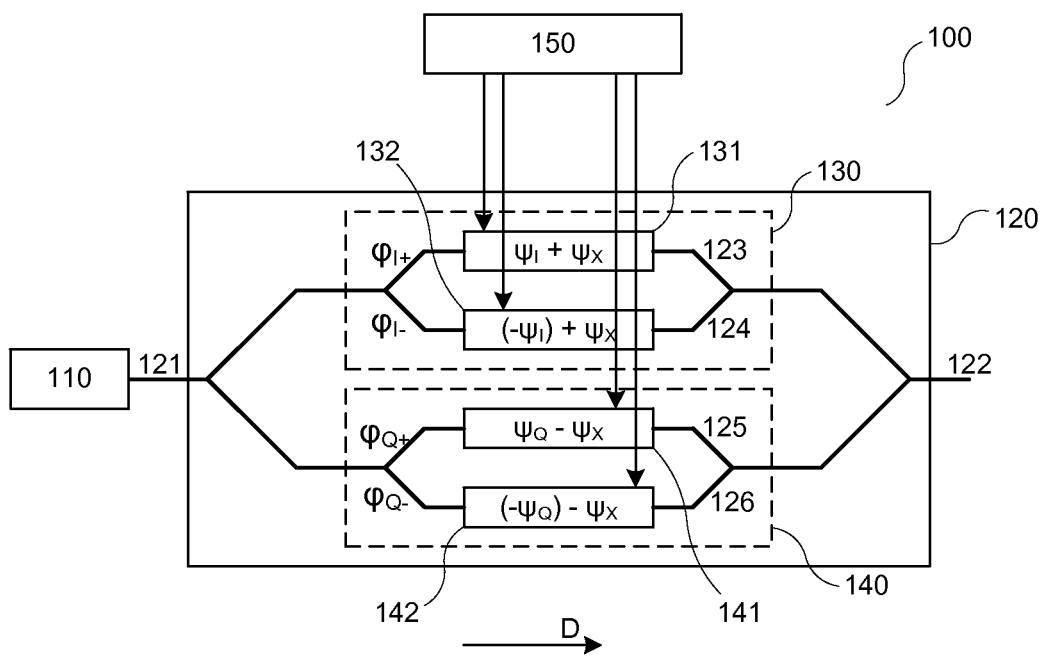
FIG. 1b shows a modulating device according to a first embodiment of the invention.

FIG. 1b illustrates the electrodes 131, 132, 141, 142 of the device 100 in a state in which symbol 1 (see table III, below) is modulated. For this symbol, the first variable modulating phase shift $P1_1=\psi_I$; the second variable modulating phase shift $P2_1=\psi_Q$; and the common phase shift is $C_1=\psi_X$. Hence, for path 123 of FIG. 1b and for symbol 1, $\Delta\theta_{I+}=\psi_I+\psi_X$. The other paths 124, 125, 126 have values for $\Delta\theta_{I-}$, $\Delta\theta_{Q+}$ and $\Delta\theta_{Q-}$, respectively, according to FIG. 1b.

In, for instance, a four symbol modulation scheme, for the remaining symbols 2, 3 and 4, the values for $P1_s$, $P2_s$, and $C_s$ are all $\pm\psi_I$, $\pm\psi_Q$ and $\pm\psi_X$, respectively.

TABLE II

| Symbol | I | Q | $\phi_{I+}$ | $\phi_{I-}$ | $\phi_{0+}$ | $\phi_{0-}$ | $\Delta\theta_{I+}$ | $\Delta\theta_{I-}$ | $\Delta\theta_{Q+}$ | $\Delta\theta_{Q-}$ |
|---|---|---|---|---|---|---|---|---|---|---|
| 1 | 1 | 1 | $-\frac{\pi}{2}$ | $+\frac{\pi}{2}$ | 0 | $+\pi$ | $+\frac{\pi}{2}$ | $-\frac{\pi}{2}$ | $+\frac{\pi}{2}$ | $-\frac{\pi}{2}$ |
| 2 | 1 | -1 | $-\frac{\pi}{2}$ | $+\frac{\pi}{2}$ | 0 | $+\pi$ | $+\frac{\pi}{2}$ | $-\frac{\pi}{2}$ | $-\frac{\pi}{2}$ | $+\frac{\pi}{2}$ |
| 3 | -1 | 1 | $-\frac{\pi}{2}$ | $+\frac{\pi}{2}$ | 0 | $+\pi$ | $-\frac{\pi}{2}$ | $+\frac{\pi}{2}$ | $+\frac{\pi}{2}$ | $-\frac{\pi}{2}$ |
| 4 | -1 | -1 | $-\frac{\pi}{2}$ | $+\frac{\pi}{2}$ | 0 | $+\pi$ | $-\frac{\pi}{2}$ | $+\frac{\pi}{2}$ | $-\frac{\pi}{2}$ | $+\frac{\pi}{2}$ |

Table III below summarizes the four variable modulating phase shifts $\Delta\theta_{I+}$, $\Delta\theta_{I-}$, $\Delta\theta_{Q+}$ and $\Delta\theta_{Q-}$ for an exemplifying such four-symbol modulation scheme according to the invention.

In this modulation scheme, $\phi_{I+}$, $\phi_{I-}$, $\phi_{Q+}$, $\phi_{Q-}$ are the same as in table II, above, and are therefore not written out.

TABLE III

| Symbol | I | Q | $\Delta\theta_{I+}$ | $\Delta\theta_{I-}$ | $\Delta\theta_{Q+}$ | $\Delta\theta_{Q-}$ |
|---|---|---|---|---|---|---|
| 1 | 1 | 1 | $\psi_I + \Psi_X$ | $(-\psi_I) + \Psi_X$ | $\psi_Q - \Psi_X$ | $(-\psi_Q) - \Psi_X$ |
| 2 | 1 | -1 | $\psi_I - \Psi_X$ | $(-\psi_I) - \Psi_X$ | $(-\psi_Q) + \Psi_X$ | $\psi_Q + \Psi_X$ |
| 3 | -1 | 1 | $(-\psi_I) - \Psi_X$ | $\psi_I - \Psi_X$ | $\psi_Q + \Psi_X$ | $(-\psi_Q) + \Psi_X$ |
| 4 | -1 | -1 | $(-\psi_I) + \Psi_X$ | $\psi_I + \Psi_X$ | $(-\psi_Q) - \Psi_X$ | $\psi_Q - \Psi_X$ |

It is preferred that the static phase shift for at least two paths is different, preferably the static phase shift is different for the mentioned at least two, preferably at least four, symbols. In particular, setting $$\psi_I = \frac{\pi}{2}, \psi_Q = \frac{\pi}{2} \text{ and } \psi_X = \frac{\pi}{4},$$

the following preferred four-symbol modulation scheme is achieved:

TABLE IV

| Symbol | I | Q | $\Delta\theta_{I+}$ | $\Delta\theta_{I-}$ | $\Delta\theta_{Q+}$ | $\Delta\theta_{Q-}$ |
|---|---|---|---|---|---|---|
| 1 | 1 | 1 | $\frac{\pi}{2} + \frac{\pi}{4}$ | $\left(-\frac{\pi}{2}\right) + \frac{\pi}{4}$ | $\frac{\pi}{2} - \frac{\pi}{4}$ | $\left(-\frac{\pi}{2}\right) - \frac{\pi}{4}$ |
| 2 | 1 | -1 | $\frac{\pi}{2} - \frac{\pi}{4}$ | $\left(-\frac{\pi}{2}\right) - \frac{\pi}{4}$ | $\left(-\frac{\pi}{2}\right) + \frac{\pi}{4}$ | $\frac{\pi}{2} + \frac{\pi}{4}$ |
| 3 | -1 | 1 | $\left(-\frac{\pi}{2}\right) - \frac{\pi}{4}$ | $\frac{\pi}{2} - \frac{\pi}{4}$ | $\frac{\pi}{2} + \frac{\pi}{4}$ | $\left(-\frac{\pi}{2}\right) + \frac{\pi}{4}$ |
| 4 | -1 | -1 | $\left(-\frac{\pi}{2}\right) + \frac{\pi}{4}$ | $\frac{\pi}{2} + \frac{\pi}{4}$ | $\left(-\frac{\pi}{2}\right) - \frac{\pi}{4}$ | $\frac{\pi}{2} - \frac{\pi}{4}$ |

Figure 8:
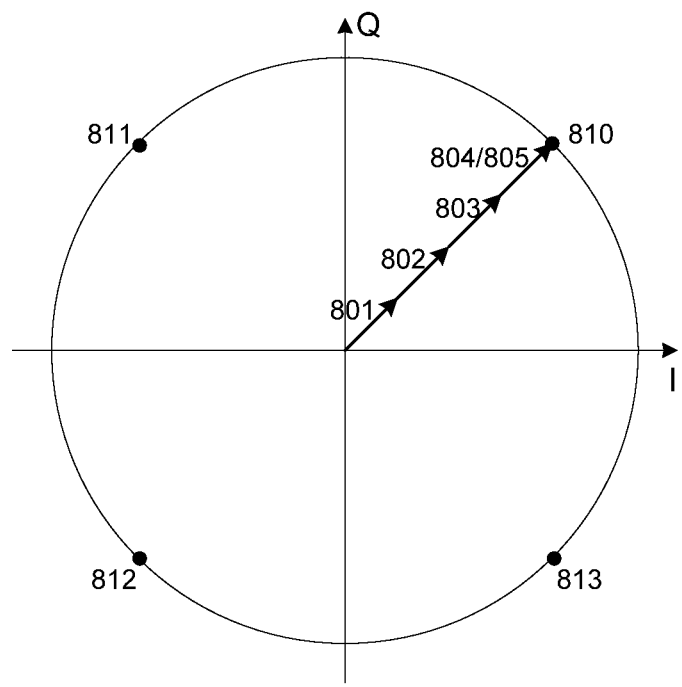

The corresponding constellation diagram is shown in FIG. 8, where the vectors 801, 802, 803, 804 represent one respective path 123, 124, 125, 126 each for symbol 1 of table IV. As is clear from FIG. 8, the resulting symbols 810, 811, 812, 813 have higher amplitude transmission than corresponding conventionally modulated symbols 210, 211, 212, 213 of FIG. 2.

In particular, it is clear from FIG. 8, as well as from table IV in combination with table II, that for all four symbols in this exemplifying case, the common phase shift amount $\psi_X$ is selected so that the total path phase shift of all four paths are equal. This is preferably the case for at least one symbol, and more preferably for the mentioned at least two, preferably at least four, symbols.

As can be seen from FIG. 8, and also if inspecting table IV in combination with the values for $\phi_{I+}$, $\phi_{I-}$, $\phi_{Q+}$, $\phi_{Q-}$ as tabulated in table II, it is realized that all paths, for all symbols, add up in phase with one another for this four symbol modulation scheme. It is preferred that this is the case for the above described at least two, preferably at least four, symbols. However, in some embodiments values for $P1_s$, $P2_s$ and $C_s$ can be selected that do not result in all paths adding up in phase for one or several symbols. See below.

Hence, in the exemplifying embodiment shown in FIG. 1b, each of the said paths 123, 124, 125, 126 is provided with a respective electrode 131, 132, 141, 142 for modifying the refractive index of the material of the respective path 123, 124, 125, 125, and the control device 150 is arranged to apply a respective electrical signal to the said respective electrode 131, 132, 141, 142 on each path 123, 124, 125, 126 in order to achieve the corresponding modulating phase shift.

More specifically, in device 100, the control device 150 is arranged to apply a respective variable electrical signal, which can assume at least two different non-zero values, to a respective electrode 131, 132, 141, 142 for each path 123, 124, 125, 126 in order to accomplish the said modulating phase shift amount, comprising both the above said pair phase shift and common phase shift.

According to another preferred embodiment, each path is however arranged with at least two electrically isolated electrodes, one respective pair phase shift electrode and one respective common phase shift electrode. In this case, for each path, the corresponding first or second pair shift amount is accomplished by the control device applying a corresponding predetermined electrical signal to a respective first of said at least two electrodes. Furthermore, for each path, the corresponding common phase shift amount is accomplished by the control device applying a corresponding electrical signal to a respective second of said at least two electrodes.

Figure 4:
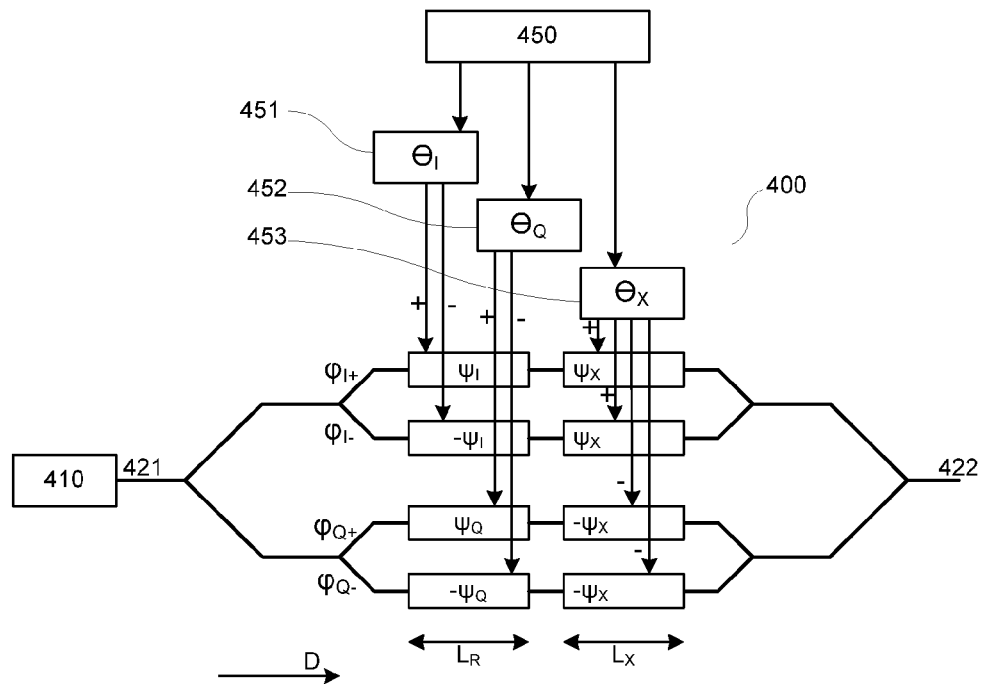
FIGS. 4-7 show respective modulation devices according to second, third, fourth and fifth embodiments, respectively, of the invention.

FIG. 4 shows an example of such a device 400 according to the present invention, arranged to modulate a light wave 421, incident from a light source 410, and to achieve, using a control means 450, a modulated light wave 422. The electrodes are marked with $\pm\psi_I$, $\pm\psi_Q$ and $\pm\psi_X$ to reflect the instantaneous modulation of symbol 1 according to table III.

As can be seen in FIG. 4, the driver electronics is arranged in the form of a master control device 450, which receives a data stream to be modulated from a data source (not shown), and which separates the said data source into a corresponding I, Q and X data stream, which are in turn fed to a respective $\theta_I$, $\theta_Q$ and $\theta_X$ control device 451, 452, 453 (compare to FIG. 2). Preferably, the I and Q data stream are used to carry the data to be modulated, and the X data stream is produced in reaction to the specific corresponding combinations of I and Q values in these data streams.

The $\theta_I$ control device 451 feeds an I data control electrical signal to an upstream electrode on a first branch of a first child MZI, marked $\psi_I$ in FIG. 4, and the same I data control electrical signal, but with opposite sign, to an upstream electrode on a second branch of the first child MZI, marked $-\psi_I$. The $\theta_Q$ control device 452 feeds a Q data control electrical signal to an upstream electrode on a first branch of a second child MZI, marked $\psi_Q$, and the same Q data control electrical signal, but with opposite sign, to an upstream electrode on a second branch of the second child MZI, marked $-\psi_Q$. The $\theta_X$ control device 453 feeds an X data control electrical signal to both a downstream electrode on the first branch of said first child MZI, marked $\psi_X$, and a downstream electrode on the second branch of said first child MZI, also marked $\psi_X$. Similarly, the $\theta_X$ control device 453 feeds the same X data control electrical signal, but with opposite sign, to both a downstream electrode on the first branch of said second child MZI and a downstream electrode on the second branch of said second child MZI, both marked $-\psi_X$. It is realized that the said upstream and downstream electrodes could come in any order on said child MZI branches.

Such a design allows for a four symbol modulation scheme in which all control voltages are binary, and which therefore can be implemented using uncomplicated circuitry and which is quickly and easily calibrated and recalibrated during use, since the negative effects of nonlinearities in the material in terms of phase shift as a function of voltage are minimized.

Since the $\theta_I$ control device 451 applies the electrical signal in a push-pull fashion, a zero total current flows from the control device 451 to the electrodes. This is advantageous in high-frequency applications, such as at symbol rates above 10 Gbaud, since the magnetic field created will then be minimal. The same is true regarding the $\theta_Q$ control device 452 and the $\theta_X$ control device 453, the latter since the control electric signal is applied in a push-pull fashion onto the two child MZIS.

It is particularly preferred that the respective absolute value of the first and second pair phase shift amounts are equal, in other words that $\psi_I = \psi_Q$, since then it will be easier to use one and the same driver for several electrodes. This can be applied to all embodiments of the invention described herein.

In particular, it is preferred that the equal value for and $\psi_Q$ is the same for all paths and for all at least two, preferably at least four symbols.

Figure 6:
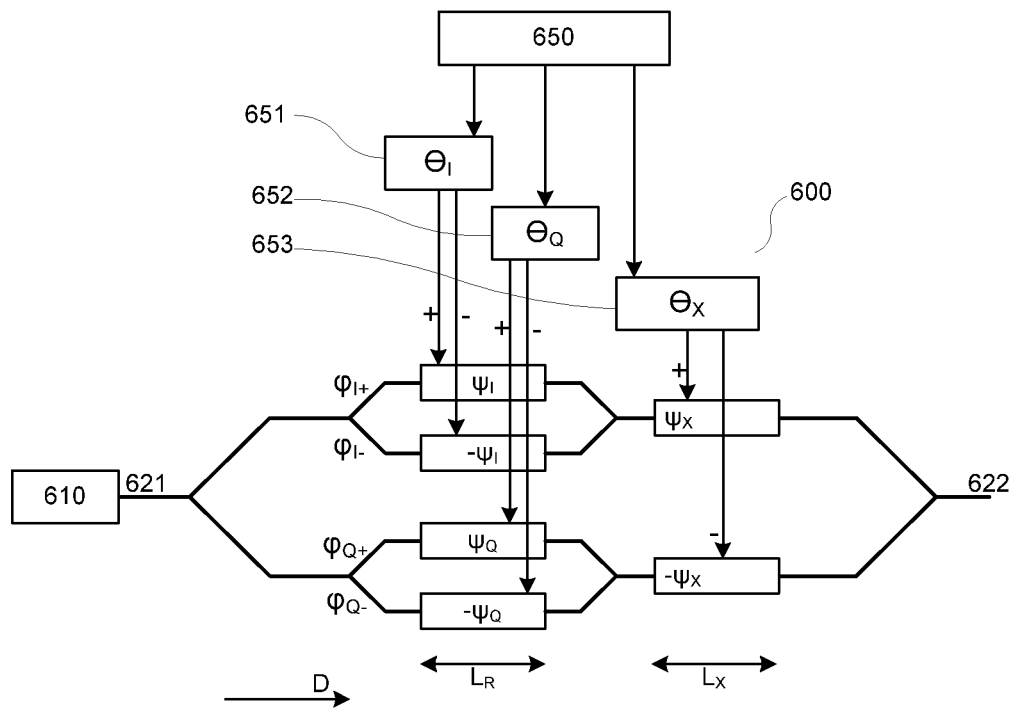

FIG. 6 is similar to FIG. 4, showing a device 600 according to the present invention, arranged to modulate a light wave 621, incident from a light source 610, and to achieve, using a master control means 650, a modulated light wave 622. The electrodes are again marked with $\pm\psi_I$, $\pm\psi_Q$ and $\pm\psi_X$ to reflect the instantaneous modulation of symbol 1 according to table III.

According to a preferred embodiment, each child MZI branch, and hence each path, is arranged with at least one individual pair phase shift electrode. In this case, as in FIG. 4, for each branch, the corresponding first or second pair shift amount is accomplished by the control device, 650-653 applying a corresponding electrical signal to the respective individual electrode. According to a preferred embodiment which is alternative to that described above in relation to FIG. 4, a first path pair comprises the first and second paths, a second path pair comprises the third and fourth paths, and each path pair is recombined into a respective recombined path, which recombined paths are then combined into one single waveguide. Then, for each path of a respective path pair, the common phase shift amount is accomplished by the control device applying a corresponding electrical signal to a respective recombined path phase shift electrode on the corresponding recombined path.

Hence, and in contrast to the device 400 of FIG. 4, in the device 600 the $\theta_X$ control device 653 is arranged to apply a respective electrical signal to one respective electrode on each child MZI, which respective electrode is arranged downstream of the recombination point of the respective child MZI. The voltages are equal but of opposite sign, so that the control device 652 applies the X data control voltages in a push-pull fashion.

It is realized that the said electrodes may just as well be located upstream of the splitting point of each respective child MZI, still arranged one on each child MZI. Hence, the common phase shift amount is in this embodiment accomplished by the control device applying a corresponding electrical signal to a respective electrode along the first and second path pair, respectively, upstream of the respective splitting point or downstream of the respective combining point of the first and second, or third and fourth, paths, respectively.

In FIG. 6, like in FIG. 4, the electrodes are of course duly electrically isolated one from the other.

This embodiment allows for a physical arrangement in which the $\theta_X$ control device 653 is arranged in closer proximity to the controlled electrodes. Also, the fewer number of electrodes as compared to FIG. 4 decreases the total capacitance of the circuit, which is beneficial for the power dissipation. In other respects, the device 600 functions in the same way as device 400.

Figure 5:
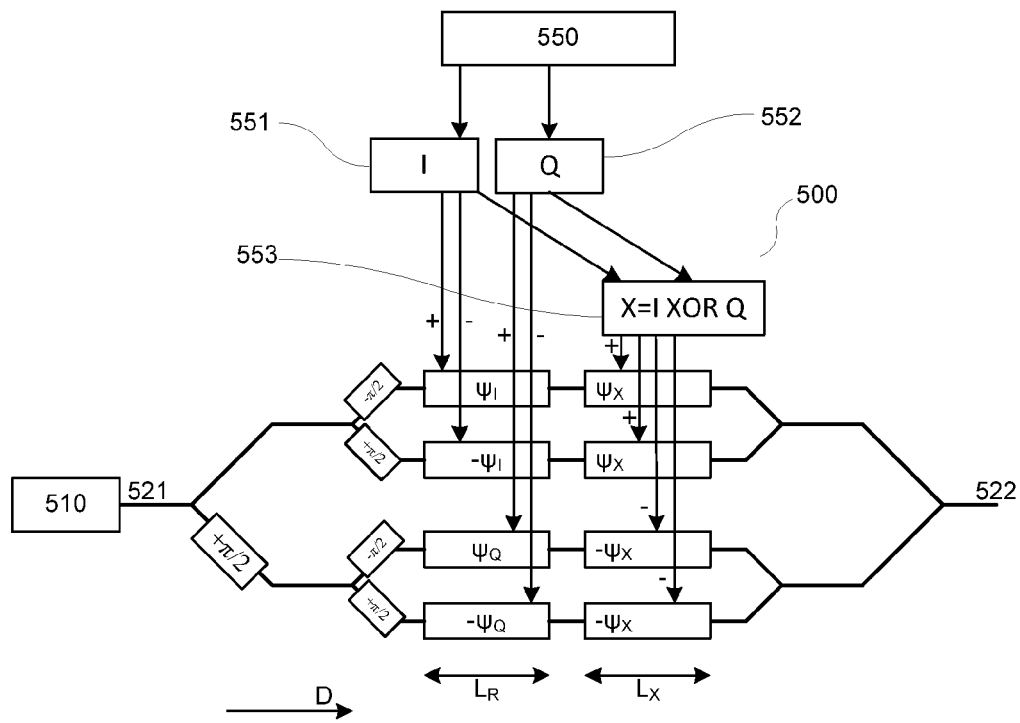
Figure 7:
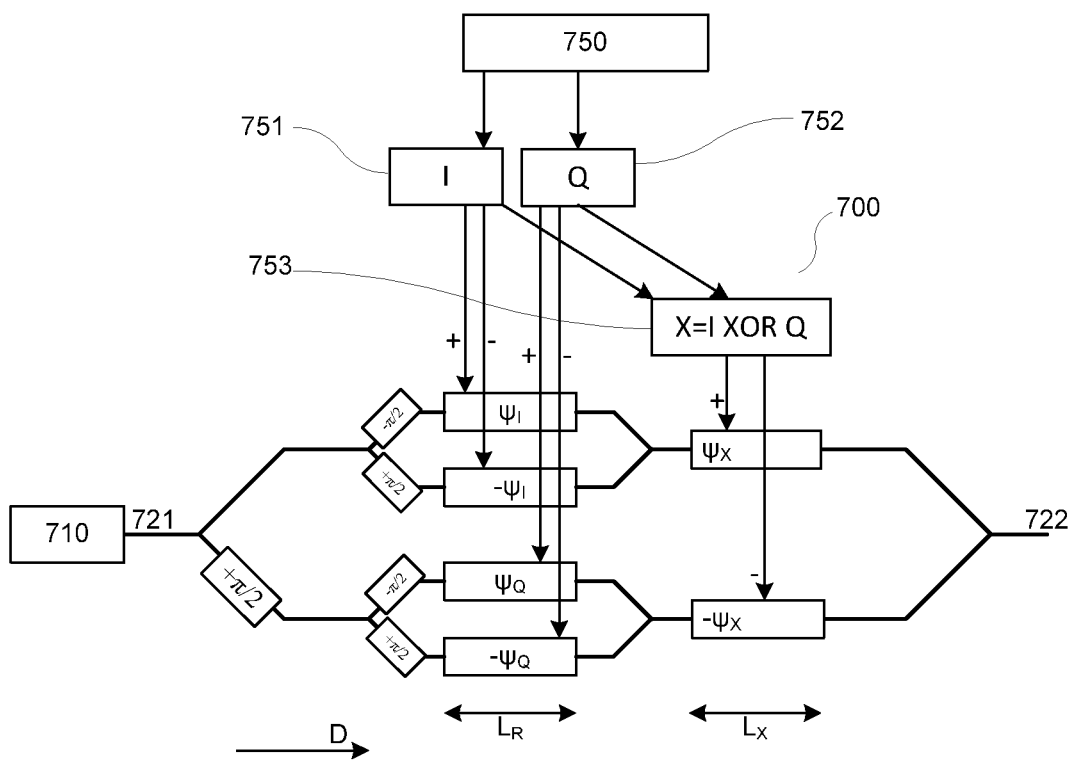

FIGS. 5 and 7 show embodiments alternative to FIGS. 4 and 6, respectively. FIGS. 5 and 7 illustrate respective devices 500, 700 according to the present invention, arranged to modulate a respective light wave 521, 721, incident from a respective light source 510, 710, and to achieve, using a respective master control means 550, 750, a respective modulated light wave 522, 722. The electrodes in both FIGS. 5 and 7 are marked with $\pm\psi_1$, $\pm\psi_Q$ and $\pm\psi_x$ to reflect the instantaneous modulation of symbol 1 according to table III.

In FIGS. 5 and 7, the static phase shift is identical to that of FIG. 1a. It is realized that even if this is preferred, it is possible to use other static phase shifts as described above and below.

FIG. 5 is similar to FIG. 4, and FIG. 7 is similar to FIG. 6. However, as opposed to what is the case in FIGS. 4 and 6, in FIGS. 5 and 7 the master control device 550, 750 controls only control devices 551, 552; 751, 752, respectively. Then, control devices 551, 552 in turn control control device 553, and control devices 751, 752 in turn control control device 753.

Hence, in FIG. 5, and correspondingly in FIG. 7, the I and Q data streams are fed to control devices 551, 552, which in a push-pull fashion apply corresponding control voltages to upstream electrodes arranged in both branches of both child MZIs. The control device 553 receives the I and Q data streams from control devices 551, 552, and applies a XOR logic to the data in order to calculate a value for X for application, in the form of a corresponding electrical signal, to corresponding downstream electrodes on each branch of each child MZI. Both I and Q data may be digital, binary data assuming values of either −1 or 1, independently. Hence, the X data will be as in table V, which also shows the corresponding I and Q data, as well as the corresponding achieved phase shift in each respective electrode:

TABLE V

| I data | Q data | X data | $\psi_I$ | $\psi_Q$ | $\psi_X$ |
|---|---|---|---|---|---|
| 1 | 1 | −1 | $\frac{\pi}{2}$ | $\frac{\pi}{2}$ | $\frac{\pi}{4}$ |
| 1 | −1 | 1 | $\frac{\pi}{2}$ | $\left(-\frac{\pi}{2}\right)$ | $\left(-\frac{\pi}{4}\right)$ |
| −1 | 1 | 1 | $\left(-\frac{\pi}{2}\right)$ | $\frac{\pi}{2}$ | $\left(-\frac{\pi}{4}\right)$ |
| −1 | −1 | −1 | $\left(-\frac{\pi}{2}\right)$ | $\left(-\frac{\pi}{2}\right)$ | $\frac{\pi}{4}$ |

It is realized that in the embodiments illustrated in FIGS. 4-7, all electrodes can be further segmented in order to further reduce total capacitance and other parasitics of each electrode, in order to in turn increase bandwidth. In this way, for instance each of the eight electrodes of FIG. 4 can be segmented into smaller parts, while keeping the total phase shift along each child MZI arm, to reach the needed bandwidth.

To match the delay in light propagation, an electrical delay between the segments may furthermore be introduced for optical modulation bandwidth, as proposed in the Swedish patent no SE523350.

As shown by the above discussion in connection to FIGS. 1b-8, the modulated light wave may be modulated according to a QPSK (Quadrature Phase Shift Keying) or QAM (Quadrature Amplitude Modulation) modulation format, such as four symbol versions of these modulation schemes.

Figure 9:
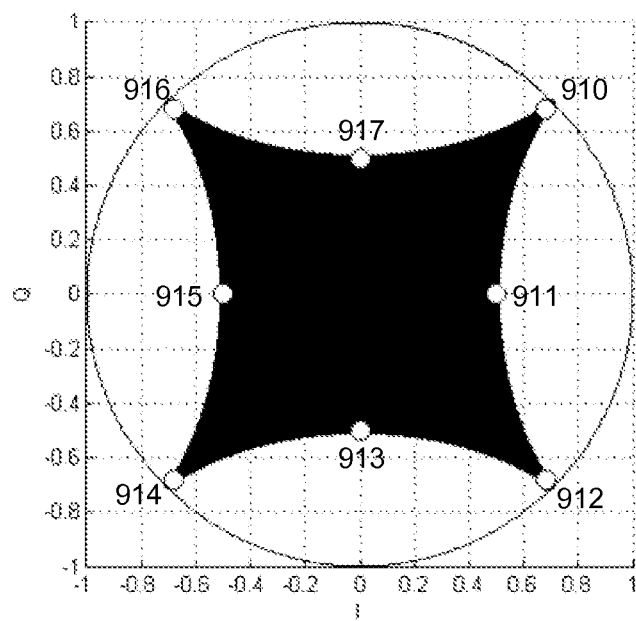

It is, however, also possible to apply the present invention to other modulation schemes, such as higher-order QAM formats. For instance, FIG. 9 illustrates a constellation diagram for a 8QAM modulation scheme involving eight symbols 910-917, modulated in accordance with the present invention. As is clear from FIG. 9, the symbols 910, 912, 914 and 916 have maximum power transmission, which is an advantage over conventional 8QAM modulation schemes.

For conventional circular 8QAM, the ratio of amplitudes of the outer and the inner ring of symbols can be $$\frac{1+\sqrt{3}}{\sqrt{2}} \cong 1.93.$$

See U.S. Pat. No. 8,077,375 for an example of circular 8QAM modulation.

Table VI shows an example of how to achieve an 8QAM constellation diagram using any one the devices shown in FIGS. 1b and 3-7, and an approach according to the invention, in which four of the symbols 910, 912, 914, 916 are modulated using first and second pair phase shifts and a common phase shift, as described above. The inner circle of symbols 911, 913, 915, 917, on the other hand, are controlled by a parameter $\psi_Y$.

To achieve the correct ratio between the amplitudes of the inner 911, 913, 915, 917 and outer circle 910, 912, 914, 916, one may calculate the amplitude $A_o$ of the outer circle as:

$$A_o = \frac{\sin(\psi_R)\cos(\psi_x) + \sin(\psi_R)\sin(\psi_x)}{\sqrt{2}} = \sin(\psi_R)\sin\left(\frac{\pi}{4} + \psi_x\right),$$

where $\psi_R = \psi_I = \psi_Q$ in the terminology used above.

We furthermore require that the amplitude $A_i$ of the inner circle symbols is $$A_i = A_n \frac{\sqrt{2}}{1+\sqrt{3}}.$$

This can be accomplished by setting $\psi_R = \sin^{-1}(2A_i)$ for $A_i \leq 0.5$ It is advantageous that $\psi_I = \psi_R$, since this reduces the number of control electrical signal values that must be applied to the electrodes. In this case, the ratio between the amplitudes $A_o$ and $A_i$ simplifies to $$\frac{A_o}{A_i} = 2\sin\left(\frac{\pi}{4} + \psi_x\right).$$

So with $$\psi_x = \sin^{-1}\left(\frac{1+\sqrt{3}}{\sqrt{2}}\right) - \frac{\pi}{4} \cong 0.52,$$

one gets the stipulated ratio while maintaining $\psi_I = \psi_R$.

Adjustments may be required since a change in absorption may accompany the intended change in phase at modulation. See below. Also, adjustments may be required due to other non-idealities, such as non-even splitting or recombination ratios between the four paths.

TABLE VI

| Symbol | I | Q | $\Delta\theta_{I+}$ | $\Delta\theta_{I-}$ | $\Delta\theta_{Q+}$ | $\Delta\theta_{Q-}$ |
|---|---|---|---|---|---|---|
| 910 | 1 | 1 | $\psi_R + \psi_X$ | $(-\psi_R) + \psi_X$ | $\psi_R - \psi_X$ | $(-\psi_R) - \psi_X$ |
| 912 | 1 | −1 | $\psi_R - \psi_X$ | $(-\psi_R) - \psi_X$ | $(-\psi_R) + \psi_X$ | $\psi_R + \psi_X$ |
| 916 | −1 | 1 | $(-\psi_R) - \psi_X$ | $\psi_R - \psi_X$ | $\psi_R + \psi_X$ | $(-\psi_R) + \psi_X$ |
| 914 | −1 | −1 | $(-\psi_R) + \psi_X$ | $\psi_R + \psi_X$ | $(-\psi_R) - \psi_X$ | $\psi_R - \psi_X$ |
| 913 | 0 | $-\frac{2}{1+\sqrt{3}}$ | 0 | 0 | $-\psi_Y$ | $\psi_Y$ |
| 915 | $-\frac{2}{1+\sqrt{3}}$ | 0 | $-\psi_Y$ | $\psi_Y$ | 0 | 0 |
| 911 | $\frac{2}{1+\sqrt{3}}$ | 0 | $\psi_Y$ | $-\psi_Y$ | 0 | 0 |
| 917 | 0 | $\frac{2}{1+\sqrt{3}}$ | 0 | 0 | $\psi_Y$ | $-\psi_Y$ |

Figure 10A:
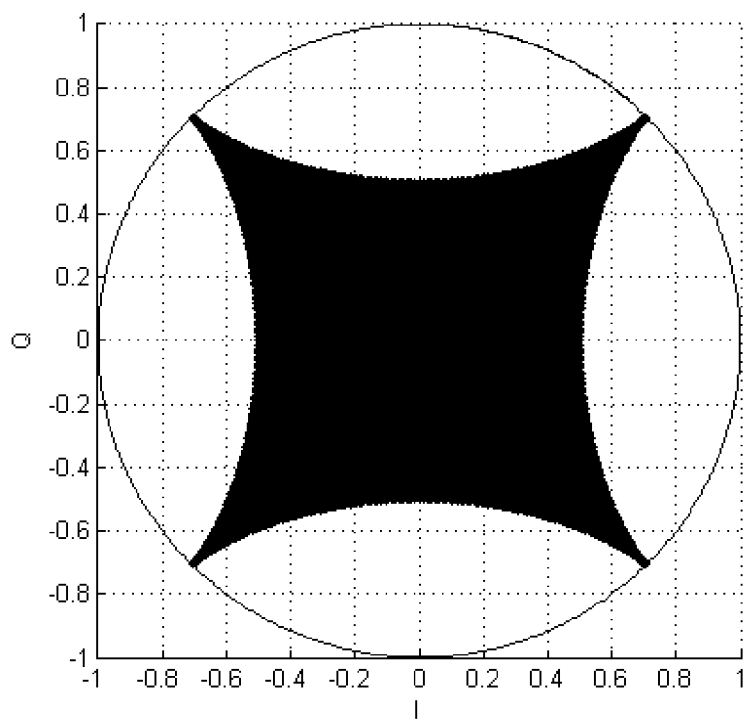
Figure 10B:
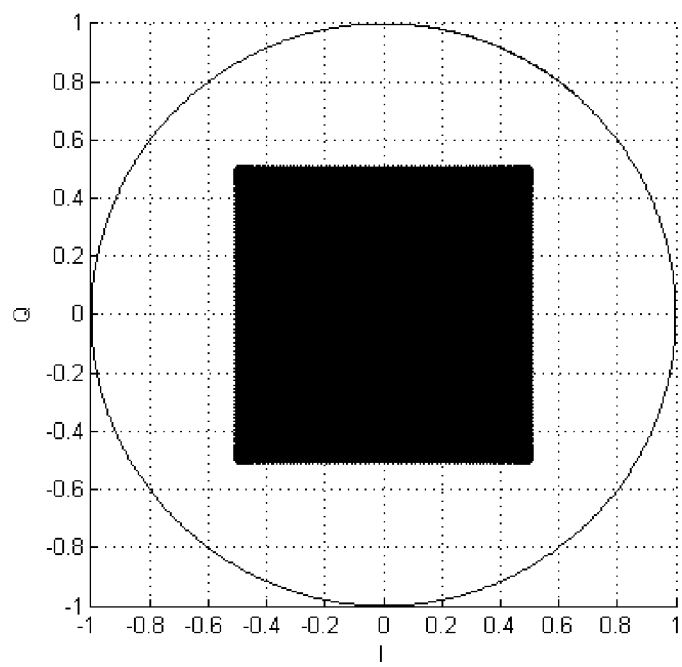
FIG. 10b shows a phasor or constellation diagram of a conventional modulating device.

FIG. 10a is a phasor diagram showing, in solid black, the modulation area which is possible to cover by a device according to any one of FIGS. 1b, 3-7 and a method according to the present invention, again assuming even splitting and recombination ratios. FIG. 10b is a corresponding phasor diagram showing the corresponding modulation area for a conventional IQ modulator, such as the one shown in FIG. 1a. Clearly, the area of FIG. 10a is larger than that of FIG. 10b.

It is realized that the various embodiments of the devices and methods according to the invention described herein can be adapted for other modulation schemes, as long as the symbols used are held within a modulation area such as the one shown in FIG. 10a.

For a system such as the one described in Table III, assuming zero absorption and zero losses, and for the special case when $t_p=0.25$ and the preferred case in which $\psi_R-\psi_I=\psi_Q$, we can calculate the power transmission, i.e. the square modulus of $t_s$:

$$T = \sin^2(\psi_R) * \cos^2\left(\frac{\pi}{4} - \psi_X\right).$$

Figure 11:
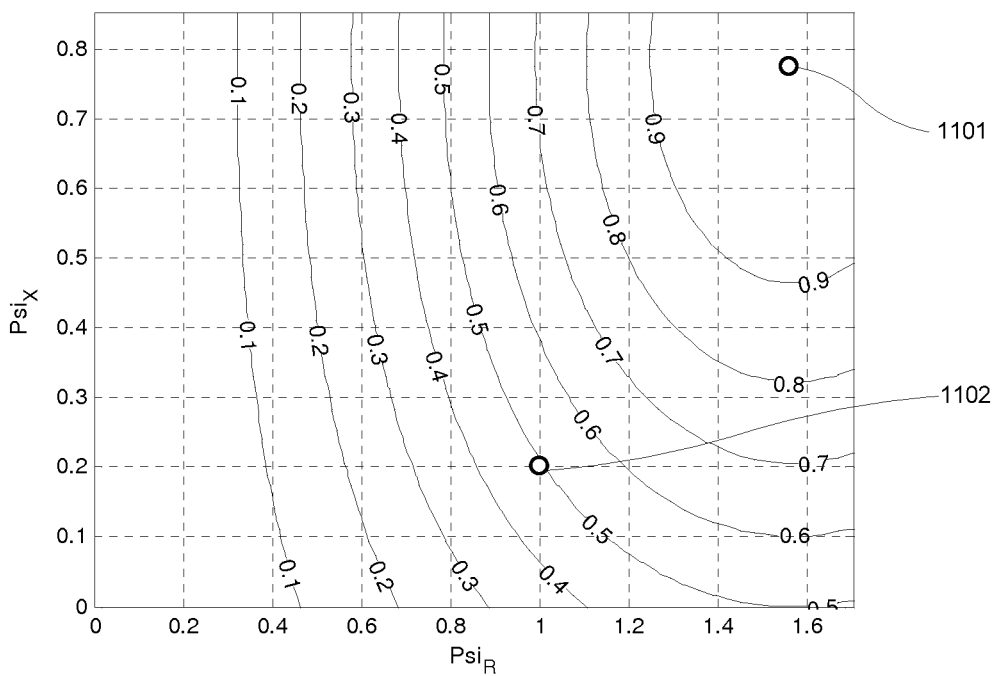
FIG. 11 is a diagram showing the power transmission for a modulating device according to the invention for different combinations of phase shifts.

The value for T is illustrated in FIG. 11 as a function of $\psi_R$ (X-axis) and $\psi_X$ (Y-axis).

Apart from the case discussed above in which $$\psi_R = \frac{\pi}{2} \text{ and } \psi_X = \frac{\pi}{2}$$

(point 1101), in which all paths are added fully in phase, from FIG. 11 it is clear that there are also other alternatives. For example, for the conventional IQ modulator described above in relation to FIG. 1a, $$\psi_R = \frac{\pi}{2}$$

and $\psi_X=0$. At this point, the power transmission is 0.5. FIG. 11 shows that it is possible to follow the contour line marked 0.5, and select any one of the combinations of $\psi_R$ and $\psi_X$ along that contour line in order to, using a method according to the invention, obtain the same power transmission. For example, the point $\psi_R=1$, $\psi_X=0.2$ (point 1102) has about the same power transmission loss as the conventional IQ modulator due to the out of phase addition of paths. However, this particular combination is considerably shorter in total electrode length than the conventional IQ modulator, which has advantages in terms of total capacitance of the electrodes and material cost.

Hence, a manufacturing or calibration method according to the present invention comprises a calibration step, performed before the above described modulation of symbols is performed. Such calibration method may also be performed as a recalibration step after some use of the device.

In said calibration step, the respective first and second pair phase shift amounts and the respective common phase shift amount are selected so that, for the above mentioned at least two, preferably at least four, of the symbols in the said set of symbols, the respective absolute value of both the first $P1_s$ and second $P2_s$ pair phase shift amounts are larger than 0 but less than $$\frac{\pi}{2};$$

the absolute value of the common phase shift amount $C_s$ is >0; and the combination of the respective first and second pair phase shift amounts and the respective common phase shift amount results in a power transmission of the light wave modulating device which is at least as high as if the first pair phase shift amount and the second pair phase shift amount had both been selected to be $$\frac{\pi}{2}$$

and the common phase shift amount had been selected to be 0, i.e. using a conventional IQ modulator.

Preferably, the first $P1_s$ and second $P2_s$ pair phase shift amounts are, for the said at least two, preferably at least four, symbols, selected so that their absolutes values are equal.

Specifically, it is preferred that the absolute value of the first pair phase shift amount $P1_s$ and the second pair phase shift amount $P2_s$ are both selected to be about $$\frac{\pi}{2}$$

and that the common phase shift amount $C_s$ is selected to be about $$\frac{\pi}{4},$$

in other words a point which is located in the vicinity of or at point 1101 is selected. However, "about π/2" and "about $$\frac{\pi}{4"}$$

also encompass points that are optimized for power transmission in a way corresponding to the present embodiment, but after also taking into consideration absorption, as described below.

As described above, a electrical signal is applied to the electrodes for modulating the light wave. Apart from the intended voltage modulation, there can also be voltage noise, which can be translated into corresponding noise in phase or amplitude of the optical output. A conventional IQ modulator has low noise in all symbols for QPSK modulation. Since both child MZIs are typically used at the maximum for their respective sinusoidal at $$\pm\frac{\pi}{2},$$

there is essentially no noise if the two electrodes of the child in question are connected to the same driver, since the noise distributed to the two electrodes are anti-symmetric. In the following, any common-mode noise from the driver is neglected.

The noise is analyzed for the device 400 shown in FIG. 4 and for QPSK modulation. However, it is realized that analogous analyses can be made for other devices and modulation methods according to the invention. Hence, one can derive how the noise is transferred from an uncertainty in the phase of each pair of electrodes to an uncertainty in the complex position in the constellation diagram. It is assumed that the drivers $\theta_I$ 451 and $\theta_Q$ 452 supply a respective phase shift of $\pm\psi_R$, where $\psi_R=\psi_I=\psi_Q$ as described above, with a differential noise of $\Delta\psi_R$. Furthermore, it is assumed that the driver $\theta_X$ 453 provides a differential phase shift of $\pm\psi_X$ with a differential noise of $\Delta\psi_X$. Then, the noise $\Delta t^2$ in the complex amplitude and Error Vector Magnitude can be derived:

$$\Delta t^2 = (\Delta t_I^2 + \Delta t_Q^2) = 2\Delta\psi_R^2 \cdot \cos^2(\psi_R) + 2\Delta\psi_X^2 \cdot \sin^2(\psi_R) \cdot (1-\sin(2\psi_X))$$

The Signal to Noise Ratio (SNR) can then be calculated by dividing the power transmission $$T = \sin^2(\psi_R) * \cos^2\left(\frac{\pi}{4} - \psi_X\right)$$

by the noise:

$$SNR = \frac{T}{\Delta t^2}$$

Note that this is the inverse of the Error Vector Magnitude.

Figure 12:
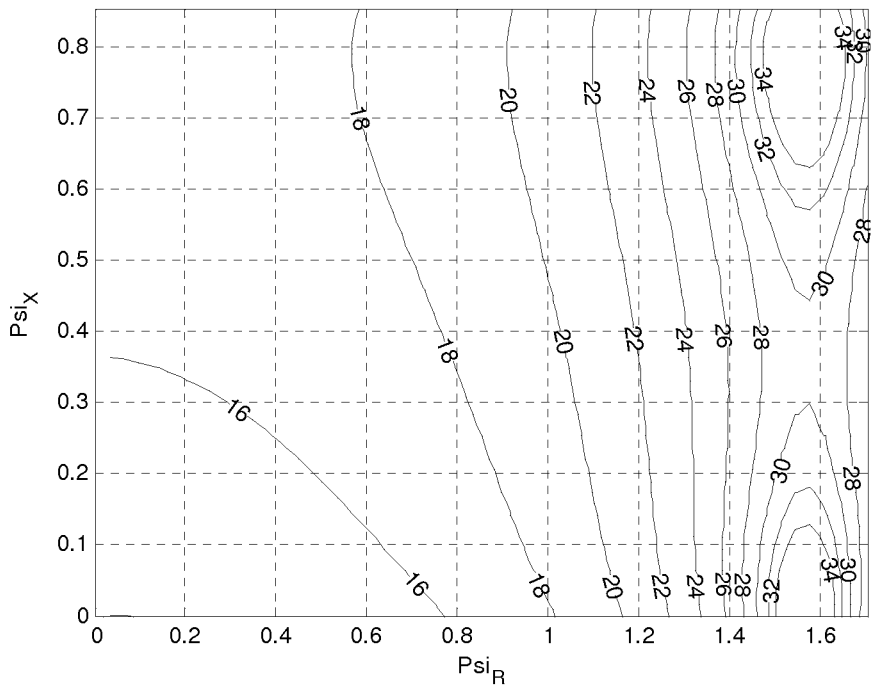
FIG. 12 is a diagram showing the signal to noise ratio for a modulating device according to the invention for different combinations of phase shifts.

Using an assumed SNR for the voltage signal from the drivers $\theta_I$, $\theta_Q$ and $\theta_X$ of 20, i.e.

$$\Delta\psi_R = \frac{\psi_R}{10} \text{ and } \Delta\psi_X = \frac{\psi_X}{10},$$

the SNR for different combinations of $\psi_R$ and $\psi_X$ are shown in FIG. 12. It is clear from this figure that the SNR is very good for the conventional operation point of a conventional IQ modulafor at $$\psi_R = \frac{\pi}{2}, \psi_x = 0.$$

Another SNR maximum is at the above described, preferred operation point according the present invention at $$\psi_R = \frac{\pi}{2}, \psi_x = \frac{\pi}{4}.$$

It is also worth noting that, for QPSK modulation, noise in $\psi_X$ does not result in phase noise in the modulated signal, only amplitude noise. In FIG. 12, amplitude noise and phase noise are not distinguished. However, for QPSK modulation, amplitude noise is known to be less problematic for system performance than phase noise.

In order to achieve a certain required phase modulation using an electrode and for a predetermined voltage, the modulated electrode needs to have a certain length. In general, larger phase shifts require longer electrodes.

In the preceding discussion, the loss associated with absorption per unit length of the electrode has been ignored. However, according to one aspect of the invention, absorption is also taken into account when optimizing the power transmission of a device according to the present invention.

In the figures, $L_R$ and $L_x$ represent the longitudinal length, in the direction of light propagation, of the pair phase shifting and common phase shifting electrodes, respectively. The lengths $L_R$, $L_x$ required are directly related to parameters $\psi_I$, $\psi_Q$ and $\psi_Y$. Assuming that the peak to peak voltage for each control device output is $V_{pp}$, and that the index change in the electrode can be described by the derivative $$\frac{dn}{dV},$$

the phase change over the length L is $$\Delta\theta_{pp} - \frac{2\pi}{\lambda}\frac{dn}{dV}V_{pp}L,$$

why the total length of each pair phase change electrodes therefore is $$L_R = \frac{2\psi_R}{\frac{2\pi}{\lambda}\frac{dn}{dV}V_{pp}},$$

with $\psi_R=\psi_I=\psi_Q$ as above, and the required length of each common phase change electrode is $$L_X = \frac{2\psi_X}{\frac{2\pi}{\lambda}\frac{dn}{dV}V_{pp}}.$$

To include the case of a nonlinear relation between refractive index and voltage, $$\frac{dn}{dV}V_{pp}$$

can be replaced by $n_{pp}$, the peak to peak index modulation in the section.

Hence, the total electrode length for each respective path is $L_{tot}=L_R+L_X$, and the lengths can be subdivided into segments as described above.

In order to investigate the effect of absorption for various values of $\psi_R$ and $\psi_X$, the following modified expression can be used for the power transmission:

$$T = \sin^2(\psi_R) * \cos^2\left(\frac{\pi}{4} - \psi_X\right) * e^{-2(\psi_X+\psi_R)*A}, \quad (2)$$

where A is a parameter defined as follows.

Consider the case with a fixed modulation voltage $V_{pp}$ from a certain driver onto an electrode, which causes a certain modulation $\Delta\beta$ of the propagation constant. If a certain phase modulation $\Delta\psi$ is required, the electrode length needs to be $$L = \frac{\Delta\psi}{\Delta\beta}.$$

Then, define $$A = \frac{\alpha L}{\Delta \psi} = \frac{\alpha}{\Delta \beta},$$

which depends on the material properties of the device and the driver voltage, where α is the loss per unit length. If A is large, it will be less favorable to have a long electrode with high $\psi_R$, $\psi_X$, since the increased length will cause more loss which will defeat any improvement the longer electrode provides in terms of more constructive interference.

To further explain the details of (2), the factor 2 in the exponent is due to the fact that $\Delta \psi = 2(\psi_R + \psi_X)$.

Figure 13A:
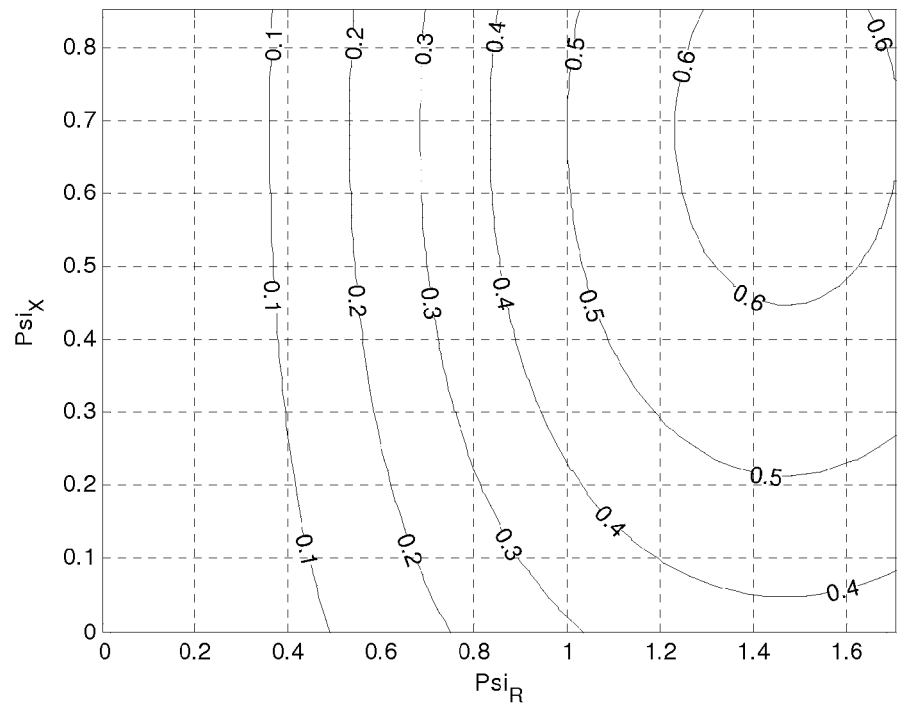
FIGS. 13a-13b are respective diagrams showing power trans-missions for a modulating device according to the invention for different combinations of phase shifts taking into consideration electrode absorption.
Figure 13B:
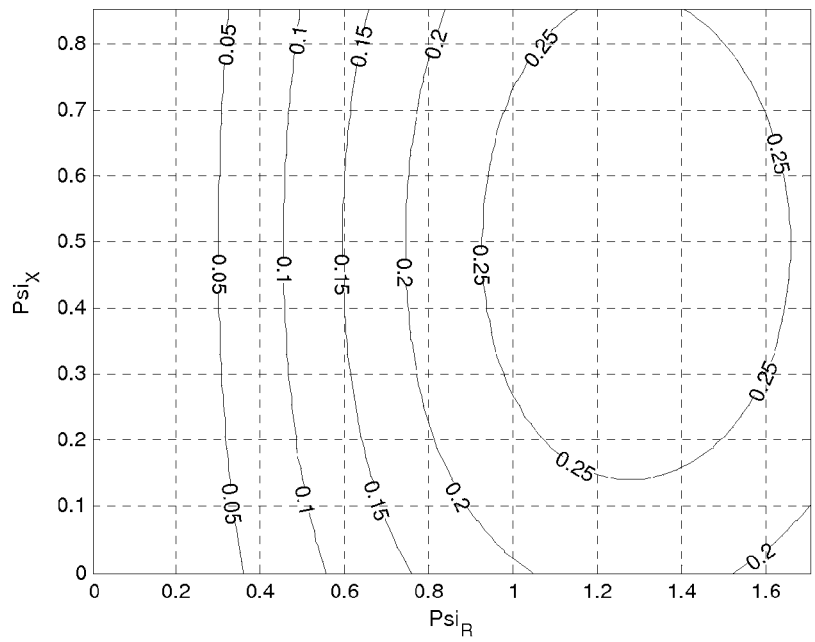

FIGS. 13a and 13b correspond to FIG. 11, but taking into consideration absorption, using (2) and with A=0.1 and 0.3, respectively.

According to a preferred embodiment of a manufacturing or calibrating method according to the present invention, the operation point of maximum transmission power is selected according to a graph such as the one shown in FIG. 13a or 13b, taking into consideration absorption. In other words, a combination of first $P1_s$ and second $P2_s$ pair phase shift amounts and common phase shift amount $C_s$, is selected, so that, under a modulation scheme as described above in relation to FIGS. 1b, 3-7, the power transmission is maximized when considering both interference and absorption for the modulating device in question. Of course, a three-dimensional diagram, analogous to the one shown in FIG. 13a or 13b, can be created if $\psi_I \neq \psi_Q$, in which case the corresponding maximization can be performed in a straight-forward way.

It can be noted that, typically, the optimal values for $\psi_R$ and $\psi_X$ when considering absorption will be lower than the corresponding best transmission values when ignoring absorption.

According to another preferred embodiment, the common phase shift amount $C_s$ is selected as the value that optimizes the power transmission under condition that the total electrode length $L_{tot}$ for each path is a predetermined fixed value, implying that $\psi_R + \psi_X$ is a predetermined constant.

Figure 14A:
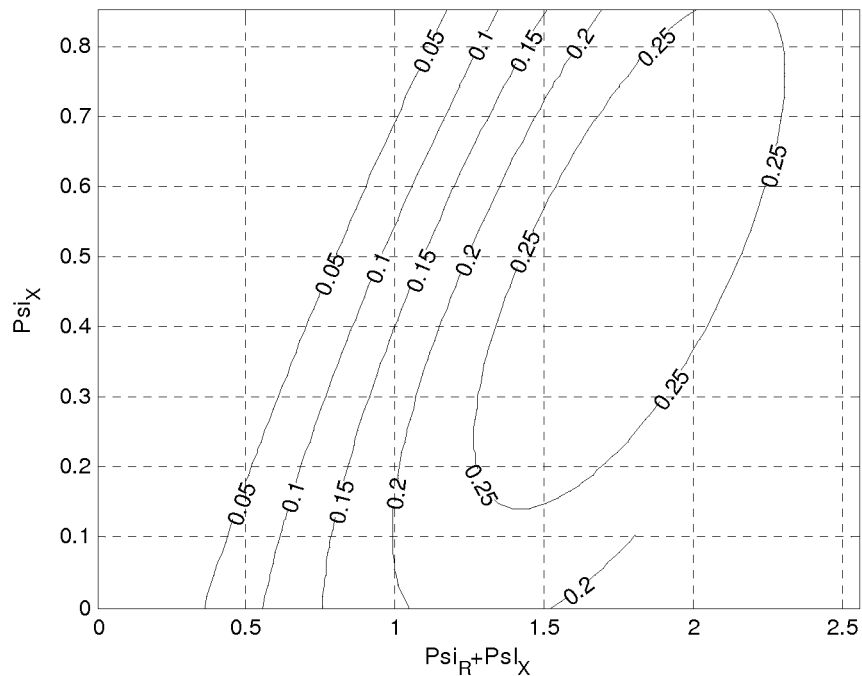
FIGS. 14a-14b are both similar to FIG. 13b, but with a different X-axis.
Figure 14B:
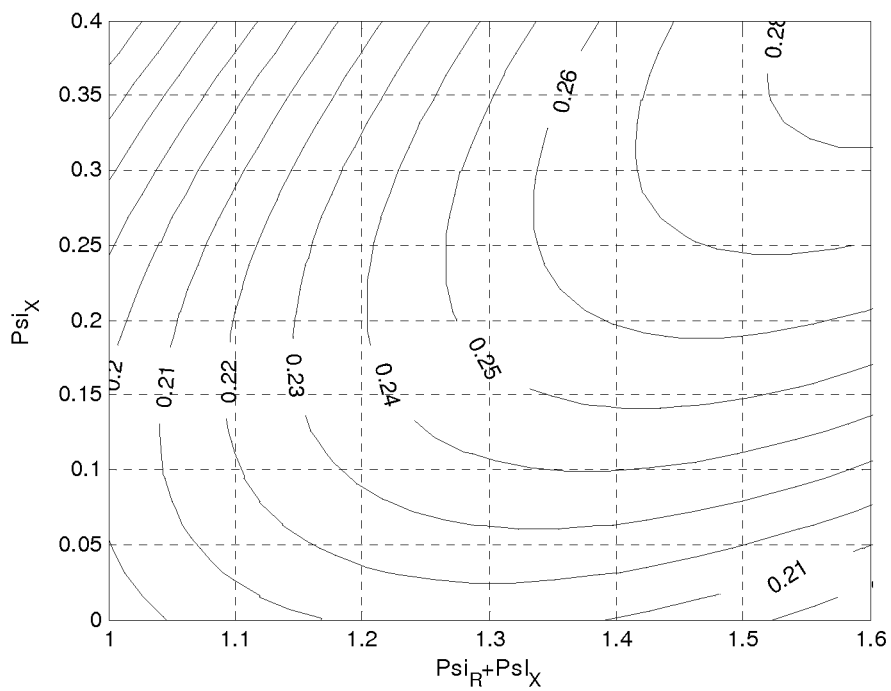

FIGS. 14a and 14b illustrates a method for selecting such optimal common phase shift amount value. The chart shown in FIG. 14a, and, in magnification, in FIG. 14b, is the same as that shown in FIG. 13b, but in which the X-axis is $\psi_R + \psi_X$.

For example, in order to find the value for $\psi_X$ which maximizes the power transmission under the assumption that $\psi_R + \psi_X = 1.3$, it can be seen from FIGS. 14a and 14b that the best transmission is found at approximately $\psi_X = 0.25$, so that $\psi_R = 0.05$.

According to another preferred embodiment, the combination of $\psi_R = \psi_I = \psi_Q$ and $\psi_X$ is selected that gives the shortest total electrode length for each path, in the current embodiment the smallest value for $\psi_R + \psi_X$, and which results in the same transmission as the corresponding conventional IQ modulator with tPx=⁰. For instance, starting from a conventional IQ modulator with $\psi_X = 1.3$, $\psi_X = ^0$, one can follow the contour lines in FIGS. 14a and 14b, and end up at the leftmost point of the contour line in question at $\psi_R + \psi_X = 1.08$, $\psi_X = 0.15$. Hence, in this case it is possible to, by applying the present invention, achieve a reduction of the total electrode length by a factor $$\frac{1.08}{1.30} \cong 0.83$$

as compared to the conventional IQ modulator case, with no reduction in power transmission.

Specifically, it is preferred that this optimization takes place under the additional condition that the SNR for the device in question, as discussed above, does not increase as compared to the conventional case.

In a corresponding way, the common phase shift amount can selected as the value that optimizes the power transmission under condition that the total electrode length for all paths, as opposed to each individual path, is a predetermined fixed value. This allows for a minimization of the total electrode length in the device as a whole, which in turn minimizes thermal losses.

Hence, the present invention achieves a high power transmission modulating device in which a conventional respective push-pull control of a first set of electrodes on each respective child MZM is combined with an additional phase shift push-pulled onto each child MZM. The additional phase shift is applied in different ways for different symbols, but always as a certain positive electrical signal to one child MZM and the same but negative electrical signal to the other child MZM. Hence, only three parameters are necessary to control the MZM aggregate over a broad spectrum of optimal symbols: the first child MZM push-pull electrical signal, the second child MZM push-pull electrical signal and the additional push-pull electrical signal.

This allows the creation of a Q path phase shift which is better aligned with the corresponding I path phase shift for each symbol, hence creating constructive rather than destructive interference in the modulated light wave, and as a result higher output power.

By carefully selecting the combination of the push-pull electrode voltages and the corresponding additional phase shift, symbols can be created that maximize the total power, even when taking into consideration both the interference aspect and the increased losses associated with longer electrodes in the MZM arms.

As an additional advantage, the voltages can be selected so that zero net current can be applied to each electrode pair, which is advantageous for high-frequency applications.

Above, a number of exemplifying embodiments have been described. However, it is realized that many modifications can be made to these embodiments without departing from the basic idea of the invention.

For instance, in many embodiments $\psi_R = \psi_R = \psi_I = \psi_Q$. It is realized that, in practice, $\psi_I \neq \psi_Q$, i.e. the absolute values of the first and second pair phase shift can be different.

Furthermore, the various manufacturing or calibration methods described herein will of course modify the details regarding how a modulation method according to the present invention is performed, why such modulation methods may also encompass the various calibration steps described.

Also, there are other ways, which are conventional as such, to variably phase shift a light wave travelling in a wave guide than by using a refractory index changing electrode.

Moreover, the present invention can be applied to a reflective type modulator, in which the waveguiding input and output are the same or at least on the same side of the chip, and in which a highly reflecting facet or the like is arranged to reflect the incident light back along the same waveguide along which the light incident to the reflector travels. In this case, the common phase modulating electrode may for instance be traversed twice by the light travelling through the modulator.

Hence, the present invention is not limited to the described embodiments, but can be varied within the scope of the enclosed claims.

The invention claimed is:

1. Method for modulating a carrier light wave so that a modulated light wave is achieved, which modulated light wave carries information by means of symbols selected from a set of at least two different symbols, wherein the carrier light wave is led through a modulating interferometer comprising a respective first, second, third and fourth parallel-coupled waveguiding modulation path, wherein the carrier light wave is first split, subsequently led through said four paths and then recombined, wherein for modulating each respective symbol the respective light led through each respective path, between the said split and the said recombining, is phase shifted by a respective total path phase shift, which total path phase shift is the sum of a possible respective first, second, third or fourth static phase shift and a respective first, second, third or fourth variable modulating phase shift amount, and wherein each symbol in the said set of symbols is associated with a respective combination of such total phase shift amounts, characterized in that, for at least two of the symbols in said set of symbols there is defined a respective first non-zero pair phase shift amount, a respective second non-zero pair phase shift amount and a respective non-zero common phase shift amount, in that, for each of said at least two symbols, the absolute value of said first pair phase shift amounts are equal, the absolute value of said second pair phase shift amounts are equal and the absolute value of said common phase shift amounts are equal, and in that, for each of said at least two symbols, the first respective variable modulating phase shift amount is equal to the sum of the respective first pair phase shift amount and the respective common phase shift amount;

the second respective variable modulating phase shift amount is equal to the sum of the negative of the respective first pair phase shift amount and the respective common phase shift amount;

the third respective variable modulating phase shift amount is equal to the sum of the respective second pair phase shift amount and the negative of the respective common phase shift amount; and the fourth respective variable modulating phase shift amount is equal to the sum of the negative of the respective second pair phase shift amount and the negative of the respective common phase shift amount.

2. Method according to claim 1, characterized in that the static phase shift for at least two paths is different.

3. Method according to claim 1, characterized in that, for at least one symbol, the common phase shift amount is selected so that the total path phase shift of all four paths are equal.

4. Method according to claim 1, characterized in that the modulating interferometer comprises two parallel-coupled interferometers, whereof a first interferometer comprises the first and second paths and a second interferometer comprises the third and fourth paths.

5. Method according to claim 4, characterized in that each of the two parallel-coupled interferometers comprises a respective Mach-Zehnder Modulator.

6. Method according to claim 1, characterized in that each of the said paths is provided with an electrode for modifying the refractive index of the material of the respective path, and that a control device applies a respective electrical signal to a respective electrode on each path in order to achieve the corresponding modulating phase shift.

7. Method according to claim 6, characterized in that the control device applies a respective variable electrical signal, which can assume at least two different non-zero values, to a respective electrode for each path in order to accomplish the said modulating phase shift amount.

8. Method according to claim 6, characterized in that each path is arranged with at least two electrically isolated electrodes, in that, for each path, the corresponding first or second pair shift amount is accomplished by the control device applying a corresponding predetermined electrical signal to a respective first of said at least two electrodes, and in that, for each path, the corresponding common phase shift amount is accomplished by the control device applying a corresponding electrical signal to a respective second of said at least two electrodes.

9. Method according to claim 6, characterized in that each path is arranged with at least one individual electrode, in that, for each path, the corresponding first or second pair shift amount is accomplished by the control device applying a corresponding electrical signal to the respective individual electrode, in that a first path pair comprises the first and second paths, in that a second path pair comprises the third and fourth paths, in that each path pair is recombined into a respective recombined path, which recombined paths are then combined into one single waveguide, and in that, for each path of a respective path pair, the common phase shift amount is accomplished by the control device applying a corresponding electrical signal to a respective electrode along the first and second path pair, respectively, upstream of the respective splitting point and/or downstream of the respective combining point of the first and second, or third and fourth, paths, respectively.

10. Method according to claim 1, characterized in that the modulated light wave is modulated according to a QPSK (Quadrature Phase Shift Keying) or QAM (Quadrature Amplitude Modulation) modulation format.

11. Method according to claim 1, characterized in that the absolute values of the first and second pair phase shift amounts are equal.

12. Light wave modulating device comprising a carrier light wave input, a modulated light wave output and a modulating interferometer comprising first, second, third and fourth parallel-coupled waveguiding modulation paths, which device is arranged to first split the incident carrier light wave, subsequently convey the light wave through said four paths and then to recombine the light wave, wherein each path is arranged with a possible respective static phase shifting means for static phase shifting of the light wave conveyed through the path in question and a respective variable modulating phase shifting means for dynamic phase shifting of the light wave conveyed through the path in question so as to modulate the output light wave so that it carries information by means of symbols selected from a set of at least two different symbols, characterized in that, for at least two of the symbols in said set of symbols there is defined a respective first non-zero pair phase shift amount, a respective second non-zero pair phase shift amount and a respective non-zero common phase shift amount, in that, for each of said at least two symbols, the absolute value of said first pair phase shift amounts are equal, the absolute value of said second pair phase shift amounts are equal and the absolute value of said common phase shift amounts are equal, and in that, for each of said at least two symbols, each modulating phase shifting means are arranged to be controlled so that the first respective variable modulating phase shift amount is equal to the sum of the respective first pair phase shift amount and the respective common phase shift amount;

the second respective variable modulating phase shift amount is equal to the sum of the negative of the respective first pair phase shift amount and the respective common phase shift amount;

the third respective variable modulating phase shift amount is equal to the sum of the respective second pair phase shift amount and the negative of the respective common phase shift amount; and the fourth respective variable modulating phase shift amount is equal to the sum of the negative of the respective second pair phase shift amount and the negative of the respective common phase shift amount.

13. Device according to claim 12, characterized in that the modulating interferometer comprises two parallel-coupled interferometers, whereof a first interferometer comprises the first and second paths and a second interferometer comprises the third and fourth paths.

14. Device according to claim 13, characterized in that each of the two parallel-coupled interferometers comprises a respective Mach-Zehnder Modulator.

15. Device according to claim 12, characterized in that each of the said paths is provided with an electrode for modifying the refractive index of the material of the respective path, and that a control device is arranged to apply a respective electrical signal to a respective electrode on each path in order to achieve the corresponding modulating phase shift.

16. Device according to claim 15, characterized in that the control device is arranged to apply a respective variable electrical signal to a respective electrode for each path in order to accomplish the said modulating phase shift amount.

17. Device according to claim 15, characterized in that each path is arranged with a respective pair phase shift electrode and a respective common phase shift electrode which is electrically isolated from the respective pair phase shift electrode, in that the control device is arranged to, for each path, apply a respective predetermined pair phase electrical signal to the respective pair phase shift electrode so as to accomplish the corresponding first or second pair shift amount, and in that the control device is arranged to, for each path, apply a respective common phase electrical signal to the respective common phase shift electrode so as to accomplish the corresponding first or second common shift amount.

18. Device according to claim 15, characterized in that each path is arranged with an individual pair phase shift electrode, in that, for each path, the control device is arranged to apply a corresponding pair shift electrical signal to the respective individual pair phase shift electrode so as to accomplish the corresponding first or second pair shift amount, in that a first path pair comprises the first and second paths, in that a second path pair comprises the third and fourth paths, in that each path pair is recombined into a respective recombined path, which recombined paths are then combined into one single waveguide, in that each recombined path is arranged with a respective recombined path phase shift electrode, and in that the control device is arranged to apply a respective common phase shift electrical signal to each recombined path phase shift electrode so as to accomplish the corresponding common phase shift amount.

19. Method according to claim 12, characterized in that the absolute values of the first and second pair phase shift amounts are equal.

20. Method for manufacturing or calibrating a light wave modulating device according to claim 12, characterized in that the method comprises a calibration step, performed before the modulation of symbols is performed, in which, for the said at least two symbols, the respective first and second pair phase shift amounts and the respective common phase shift amount are selected so that the respective absolute value of both the first and second pair phase shift amounts is larger than 0 and less than $$\frac{\pi}{2},$$

so that the absolute value of the common phase shift amount is >0, and so that for at least said two symbols the combination of the respective first and second pair phase shift amounts and the respective common phase shift amount results in a power transmission of the light wave modulating device which is at least as high as if the first pair phase shift amount and the second pair phase shift amount had both been selected to be $$\frac{\pi}{2}$$

and the common phase shift amount had been selected to be 0.

21. Method according to claim 20, characterized in that the absolute value of the first pair phase shift amount and the absolute value of the second pair phase shift amount are both selected to be the same.

22. Method according to claim 20, characterized in that the absolute respective value of the first pair phase shift amount and the second pair phase shift amount are $$\frac{\pi}{2}$$

both selected to be about and the common phase shift amount is selected to be about $$\frac{\pi}{4}.$$

23. Method according to claim 20, characterized in that the common phase shift amount is selected as the value that optimizes the power transmission under condition that the total electrode length for each path is a predetermined fixed value.

24. Method according to claim 20, characterized in that the common phase shift amount is selected as the value that optimizes the power transmission under condition that the total electrode length for all paths is a predetermined fixed value.

25. Method according to claim 20, characterized in that a combination of first and second pair phase shift amounts and common phase shift amount is selected, so that the power transmission is maximized when considering both interference and absorption for the modulating device in question.

* * * * *